(12) United States Patent
Schuette

(10) Patent No.: US 8,489,855 B2
(45) Date of Patent: Jul. 16, 2013

(54) NAND FLASH-BASED SOLID STATE DRIVE AND METHOD OF OPERATION

(75) Inventor: Franz Michael Schuette, Colorado Springs, CO (US)

(73) Assignee: OCZ Technology Group Inc., San Jose, CA (US)

( * ) Notice: Subject to any disclaimer, the term of this patent is extended or adjusted under 35 U.S.C. 154(b) by 291 days.

(21) Appl. No.: 13/103,270

(22) Filed: May 9, 2011

(65) Prior Publication Data

US 2012/0117309 A1 May 10, 2012

Related U.S. Application Data

(60) Provisional application No. 61/332,317, filed on May 7, 2010.

(51) Int. Cl.
*G06F 12/06* (2006.01)
*G06F 12/08* (2006.01)
*G11C 16/10* (2006.01)

(52) U.S. Cl.
USPC ............ 711/209; 711/103; 711/E12.008; 711/E12.065; 711/E12.078; 707/693

(58) Field of Classification Search
None
See application file for complete search history.

(56) References Cited

U.S. PATENT DOCUMENTS

| 7,124,272 | B1* | 10/2006 | Kennedy et al. | 711/173 |
| 2006/0184723 | A1* | 8/2006 | Sinclair et al. | 711/103 |
| 2008/0192928 | A1* | 8/2008 | Yu et al. | 713/165 |
| 2011/0119462 | A1* | 5/2011 | Leach et al. | 711/166 |
| 2011/0320733 | A1* | 12/2011 | Sanford et al. | 711/135 |
| 2012/0221784 | A1* | 8/2012 | Ban | 711/103 |
| 2013/0042056 | A1* | 2/2013 | Shats et al. | 711/103 |
| 2013/0067138 | A1* | 3/2013 | Schuette et al. | 711/103 |

* cited by examiner

*Primary Examiner* — Reginald Bragdon
*Assistant Examiner* — Daniel Bernard
(74) *Attorney, Agent, or Firm* — Hartman Global IPLaw; Gary M. Hartman; Domenica N. S. Hartman

(57) ABSTRACT

A solid state drive that uses over-provisioning of NAND flash memory blocks as part of housekeeping functionality, including deduplication and coalescence of data for efficient usage of NAND flash memory devices and maintaining sufficient numbers of erased blocks to promote write performance.

20 Claims, 2 Drawing Sheets

NAND FLASH-BASED SOLID STATE DRIVE AND METHOD OF OPERATION

CROSS REFERENCE TO RELATED APPLICATIONS

This application claims the benefit of U.S. Provisional Application Nos. 61/332,317 filed May 7, 2010. The contents of this prior application are incorporated herein by reference.

BACKGROUND OF THE INVENTION

The present invention generally relates to flash memory devices. More particularly, this invention relates to a method of maintaining write performance on a NAND flash memory-based solid state drive by shuffling blocks in and out of an over-provisioning pool and proactively erasing blocks containing invalid data.

As known in the art, flash memory is a type of nonvolatile solid-state memory technology. Flash memory components store information in an array of floating-gate transistors (FGTs), referred to as cells. NAND flash cells are organized in what are commonly referred to as pages, which in turn are organized in predetermined sections of the component referred to as memory blocks. Each cell of a NAND flash memory component has a top or control gate (CG) and a floating gate (FG), the latter being sandwiched between the control gate and the channel of the cell. The floating gate is separated from the control gate by an oxide layer and from the channel by another oxide layer, referred to as the tunnel oxide. Data are stored in a NAND flash cell in the form of a charge on the floating gate which, in turn, defines the channel properties of the NAND flash cell by either augmenting or opposing the charge of the control gate. The process of programming (writing 0's to) a NAND cell requires applying a programming charge to the floating gate by applying a programming voltage to the control gate via the word lines. The control gate exerts a Fowler-Nordheim (FN) field that causes the injection of electrons into the floating gate by quantum mechanical tunneling, that is, drawing electrons from the substrate towards the positive charge present in the word line until they reach the floating gate. The process of erasing (writing 1's to) a NAND cell requires removing the programming charge from the floating gate by applying an erase voltage to the device substrate via the bit line. The substrate exerts a Fowler-Nordheim field that pulls electrons from the floating gate to deplete the floating gate of any program charge. Data are stored and retrieved on a page-by-page basis and erased on a block-by-block basis.

NAND flash memory-based solid state drives (SSDs) are becoming the storage media of choice for personal computers. However, NAND flash memory has certain peculiarities that require attention in order to prevent degradation of their performance. A specific example is the ability to maintain the write performance on a NAND flash memory-based SSD.

The change in charge distribution of the floating gate augments or counteracts any voltage applied to the control gate. The potential needed to turn "ON" the gate is subsequently used as the bit value of the cell sensed at any given read. Even though, in NAND flash memory, cells need to be programmed sequentially, that is, all cells within a given daisy chain of FGTs (typically thirty-two) must be programmed sequentially, programming and subsequent verification occurs on a per bit level. The application of a programming voltage by the word lines can only inject electrons into the floating gate. Therefore, the direction of programming can only go from a fully erased state to a fully programmed state, but not vice versa.

In order to erase NAND memory cells, the entire bit line needs to be connected to a 20V erase voltage, which causes current to flow through the entire daisy chain of FGTs and induce Fowler-Nordheim quantum mechanical tunneling between the entire bit line comprising the source and drain of all daisy-chained FGTs and the floating gates of the same FGTs, thereby inducing electron depletion of the floating gates.

As noted above, the fully-erased state of a NAND flash memory cell is a "1." Programming can only shift cells to a lower value. In the case of multilevel cell (MLC) flash memory that uses, for example, four different levels to encode two bits per cell, possible values are "11" (fully erased), "10," "01" and "00" (fully programmed). However, as mentioned above, programming in the opposite direction is not possible.

Because of the unidirectional programming of flash memory, it is not possible to overwrite data, in contrast to rotatable media hard disk drives (HDDs) or other volatile and non-volatile memory devices. Instead, the media must be fully erased before it can be reprogrammed. From an operational standpoint of a mass storage device, this limitation poses certain difficulties in that data cannot be updated, but instead must be completely rewritten. Because of the specific architecture of NAND flash and also in order to avoid erase latency, the rewriting of data entails writing the updated data to a previously erased block of NAND flash memory, which is typically a different physical block address than the original block. The block containing the previous data is flagged as invalid, which for all practical purposes is equivalent to no longer having data to the file system. However, this block cannot be rewritten until it is completely erased. Over time, such a rewrite routine will result in the majority of blocks being used, but containing invalid data. The term "used" is employed in this context to designate blocks containing invalid data, as opposed to "occupied" blocks that contain valid data. Used blocks require an erase cycle before new data can be written to them. As a result, the drive's write performance slows down significantly.

A known workaround for the used vs. occupied block issue is the implementation of garbage collection and TRIM commands, which are tools for consolidating valid data and then proactively erasing blocks with obsolete data. In this context, it is important to note that as many blocks as possible have to be in the "erased state" in order to allow fast write access. In short, TRIM (not an acronym) is an ATA-command added to and initiated on the level of the operating system, and a TRIM command may result in the contents of a drive being read into main memory, followed by analysis of valid vs. invalid data, subsequent write-back of the valid data to the drive, and purging of invalid data. Because of wear leveling, the data are typically written to different physical blocks of NAND flash memory. All blocks, the contents of which are read into memory, are erased or scheduled for erase when the data are written back. The net goal of the TRIM operation is that all data contained in any block are valid and used blocks containing invalid data are proactively recycled into the pool of erased, that is, immediately programmable blocks. Moreover, garbage collection in combination with TRIM offers to coalesce data fragments before they are written back to the non-volatile memory in a pattern to maximize occupancy of the blocks.

As can be appreciated from the above, the execution of a TRIM command requires reading out all contents of a flash memory area to be "trimmed" to the system memory, regardless of whether the data are meaningful or just left over on used blocks. TRIM is currently implemented on Microsoft Windows® 7 operating systems, which exist in 32-bit and 64-bit variations. In order to minimize variability and maximize compatibility and portability of drives between different systems running either 32-bit or 64-bit operating systems (OS), it appears advantageous to use a single form of TRIM regardless of the OS version used in any given case. Given the fact that the data need to be shadowed in system memory and that the limitation of the user-addressable memory space is 2 GB in Microsoft's 32-bit operating systems, any single instance of execution of a TRIM command cannot exceed 2 GB of non-volatile memory space from a solid state drive.

An additional drawback of an execution of the TRIM command is that it ties up substantial amounts of system resources with respect to interconnects as well as available system memory space. Therefore, TRIM command executions need to run in the background during idle phases of the system. Still, all of these drawbacks are negligible in view of the write performance maintenance of solid state drives. However, alternative methods could also be employed in order to proactively erase used but not-occupied blocks and, thus, maintain write performance of a solid state drive.

BRIEF DESCRIPTION OF THE INVENTION

The present invention provides a solid state drive and method of operating a solid state drive to maintain a steady pool of erased blocks that are ready for immediate programming if needed.

According to a first aspect of the invention, the solid state drive includes a controller and at least one NAND flash-based non-volatile memory device comprising pages that are organized into memory blocks. The memory blocks are minimum-erasable units of the memory device, and the pages are sequentially programmable and readable such that some of the memory blocks are partially written blocks. The memory blocks are partitioned into at least first and second pools that constitute two virtual address spaces of the memory device. The first pool is a user-accessible pool to which the controller virtually assigns a plurality of the memory blocks as user-accessible memory blocks, and the second pool is an over-provisioning pool to which the controller virtually assigns a plurality of the memory blocks as over-provisioned memory blocks. The solid state drive is adapted to operate such that each of the memory blocks can be transitioned between the user-accessible pool and the over-provisioning pool, data are written to pages of the memory blocks virtually assigned to either the user-accessible pool or the over-provisioning pool, pages from a first partially written block are copied into a second partially written block without accessing the host system, and the first partially written block is erased to constitute an erased block after all pages of the first partially written block have been copied to the second partially written block and without a TRIM or erase command from the host system.

According to a second aspect of the invention, the method involves operating a solid state drive within a host system. The solid state drive has a controller and at least one NAND flash-based non-volatile memory device comprising pages that are organized into memory blocks. The memory blocks are minimum-erasable units of the memory device, and the pages are sequentially programmable and readable such that some of the memory blocks are partially written blocks. The method includes partitioning the memory blocks into at least first and second pools that constitute two virtual address spaces of the memory device, with the first pool being a user-accessible pool and the second pool being an over-provisioning pool. The controller is operated to virtually assign to the user-accessible pool a plurality of the memory blocks as user-accessible memory blocks, virtually assign to the over-provisioning pool a plurality of the memory blocks as over-provisioned memory blocks, and transition the memory blocks between the user-accessible pool and the over-provisioning pool. Data are written to pages of the memory blocks virtually assigned to either the user-accessible pool or the over-provisioning pool, pages are copied from a first partially written block into a second partially written block without accessing the host system, and the first partially written block is erased to constitute an erased block after all pages of the first partially written block have been copied to the second partially written block. The erasing step is performed without a TRIM or erase command from the host system.

From the above, it should be evident that a technical effect of this invention is the ability to reorganize data stored on a NAND flash-based solid state drive without requiring host system-to-device or system interconnect bandwidth.

Other aspects and advantages of this invention will be better appreciated from the following detailed description.

DETAILED DESCRIPTION OF THE INVENTION

The present invention is generally applicable to computers and other processing apparatuses, and particularly to personal computers, workstations and other apparatuses capable of utilizing nonvolatile (permanent) memory-based mass storage devices. The invention is particularly applicable to solid-state drives (SSDs) that make use of NAND flash memory devices. Such SSDs may be configured as internal mass storage devices for a host system equipped with a data and control bus for interfacing with the SSDs. As previously described, the NAND flash memory devices store information in an array of FGTs or cells that are organized in pages, which in turn are organized in memory blocks, and the memory blocks constitute minimum-erasable units of the memory device whereas their pages are sequentially programmable and readable.

For the purpose of disambiguation, the following terminology will be used herein with the indicated meanings.

Host system: Computers and other processing apparatuses capable of using a solid-state drive to store data.

Empty block/page: A block/page of NAND flash memory that does not contain any data, either because it has not yet been programmed or because it has been erased.

Erased block/page: A block/page of NAND flash memory that appears to a host system as an empty block/page as a result of the block/page having been erased and not subsequently programmed.

Used block/page: A block/page of NAND flash memory that has been programmed and contains data, but appears to a host system as an empty block/page because it contains data that are recognized by the file system as invalid. Cells within the block/page retain programmed values and cannot be further programmed without first undergoing an erase cycle.

Occupied block/page: A block/page of NAND flash memory that has been programmed and contains valid data. The physical addresses of the block/page are associated with pointers to virtual addresses through the flash translation layer (FTL) in the controller.

Partially written block: A block of NAND flash memory containing one or more empty pages and one or more used and/or occupied pages.

Figure 1:
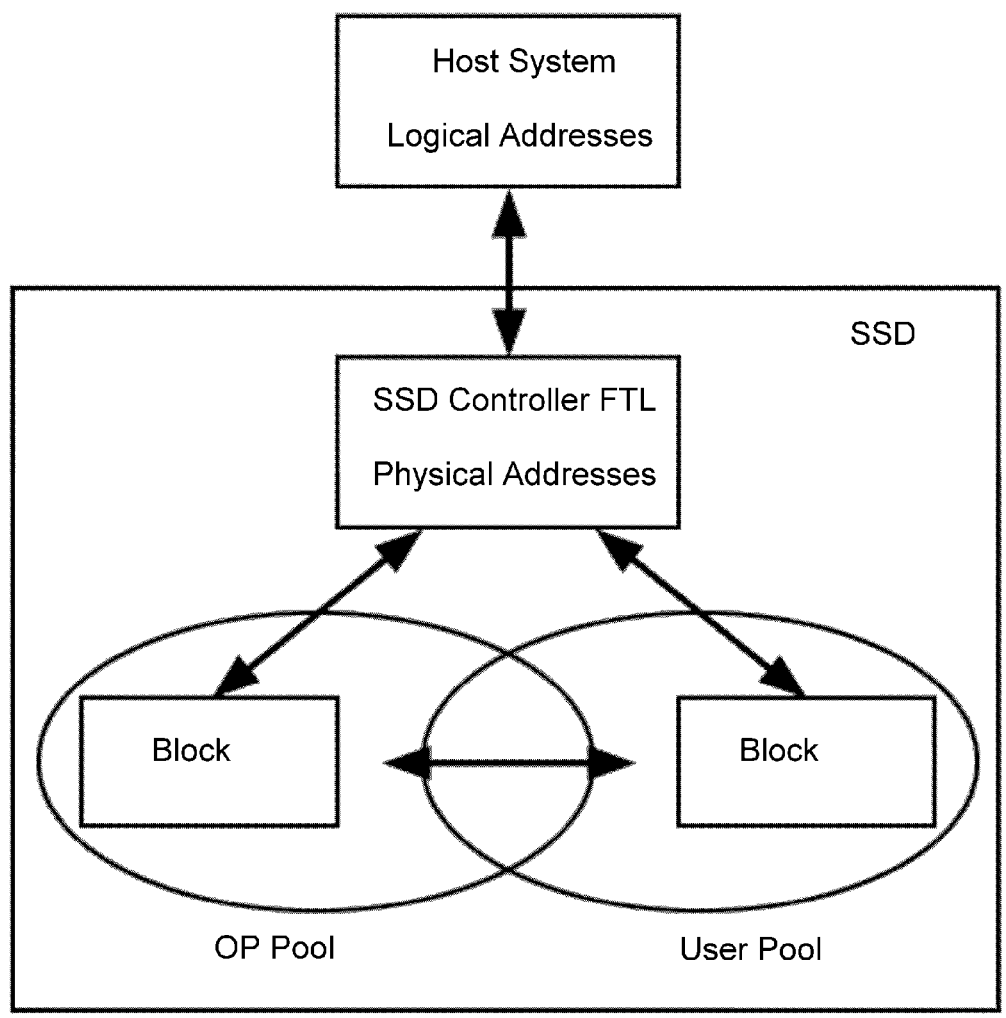
FIG. 1 shows a schematic representation of a host system generating logical addresses of data that are translated by a flash translation layer (FTL) of a solid-state drive (SSD) controller into physical addresses on one or more NAND flash memory devices on the SSD, wherein blocks of the flash memory devices are assigned to a user-accessible pool (User Pool) or an over-provisioning pool (OP Pool) and the blocks can transition from one pool to the other in accordance with the prior art.

As represented in FIG. 1, a conventional NAND flash-based solid state drive (SSD) typically uses system memory of a host system as an intermediate buffer for housekeeping functions, including the execution of TRIM commands. Data are read from NAND flash devices of the SSD into the system memory, stripped of obsolete or invalid data, and then written back to the SSD in a consolidated form. The capacities of the NAND flash devices are maximized by combining small files into contiguous segments that sequentially fill blocks of the NAND flash devices with minimal waste of non-volatile memory space. Disadvantages with this kind of operation are, as outlined above, the utilization of system memory and bus bandwidth along with the limitation of 2 GB of raw NAND flash data, regardless of whether the data are valid or not, and even regardless of whether pages within a block are programmed.

Figure 2:
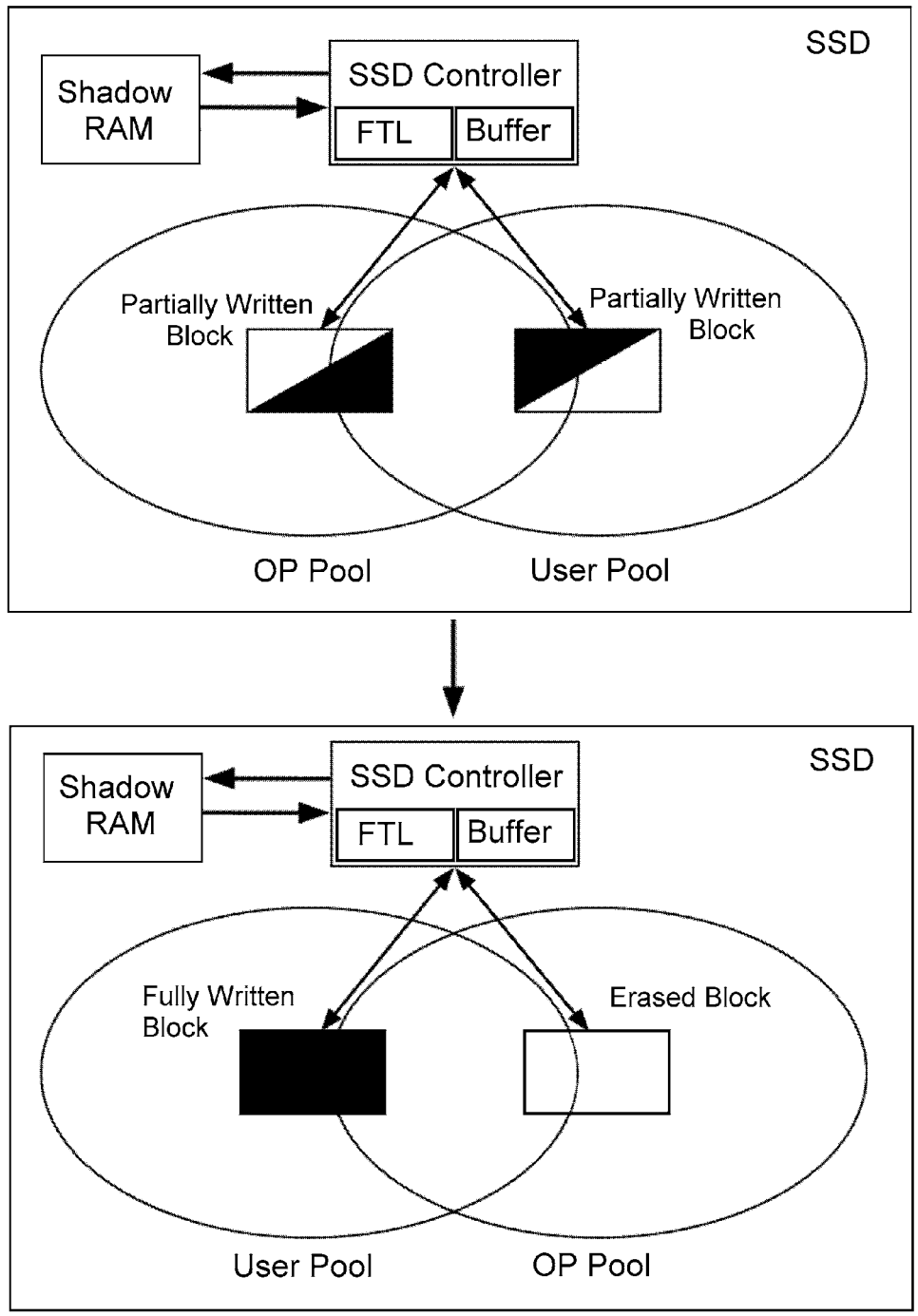
FIG. 2 shows a schematic representation of a solid-state drive (SSD) controller and its flash translation layer (FTL) adapted to translate logical addresses generated by a host system (not shown) into physical addresses on one or more NAND flash memory devices on the SSD, wherein two partially written blocks are consolidated by reading individual pages of the blocks back to the controller and then writing these pages out to free space on one of the blocks in accordance with the present invention. Either block can belong to a user-accessible pool (User Pool) or an over-provisioning pool (OP Pool) until data consolidation is completed, upon which the empty block is erased and cycled into the OP pool.

According to a preferred aspect of the invention, a method is provided for maintaining a pool of erased blocks available by partitioning the entire capacity of NAND flash memory devices of a SSD into user-accessible blocks and spare blocks. As schematically represented in FIG. 2, the user-accessible blocks will be referred to as defining a User Pool of blocks. Furthermore, the amount of spare blocks is referred to as over-provisioning (OP), and the spare blocks will be referred to as an OP Pool of blocks. According to the present invention, the allocation of each block to one of these pools is floating, meaning that each block will be cycled in and out the User Pool or OP Pool on demand using virtual assignment. Data are written to blocks that are dynamically moved in and out of the OP Pool according to one or more wear-leveling algorithms performed by a controller on the SSD. The controller may be a dedicated control logic, typically in the form of an integrated circuit (IC) chip, through which data pass when being written to and read from the memory devices. As is well known in the art, controllers of NAND flash-based SSDs are commonly adapted to keep track of wear-leveling data to ensure that each block of NAND flash memory receives the same number of program/erase cycles. Because the operation of SSD controllers for this purpose is well known, wear-leveling will not be discussed in any further detail here.

According to known principles underlying OP, blocks within the OP Pool can be cleared and erased as soon as idle phases occur that allow the controller to perform house-keeping actions. Erasing blocks within the OP Pool necessarily requires moving data from these blocks to blocks in the User Pool, or moving data from blocks in the User Pool to blocks in the OP Pool, and then re-assigning the blocks in a manner that preferentially allocates erased blocks to the OP Pool until the OP capacity requirement specified by firmware of the SSD is met. Because NAND flash memory devices do not have any moving parts, multiple pages from a single block scheduled for erasure can be copied to a single target block or to multiple target blocks in which the respective page numbers are blank, which means that the block is an erased block that does not contain data and is in a fully-erased state following a previous erase cycle. The flash translation layer (FTL) of the controller, which performs the physical to logical address translation, updates a translation lookaside buffer (TLB), which as known in the art is typically implemented as content-addressable memory (CAM) and commonly used by SSD controllers and other memory management hardware to improve virtual address translation speed. The TLB keeps track of the virtual mapping of the physical addresses of the memory devices, wherein the logical address is given as the address to return the physical address to reflect the new physical location of the data.

New data received by the SSD from a host system (not shown) are written to one or more erased (empty) pages, that is, pages that have been erased as a result of an erasing operation performed on the block containing the page and have not been subsequently programmed. According to the terminology used herein (as noted above), an erased page is neither used nor occupied. A page to which data are written can be part of an erased block within the User Pool or part of a block that has been partially written to (Partially Written Block) within the User Pool. In the latter case, some pages of a Partially Written Block contain data, that is, the pages are occupied. Also, Partially Written Blocks with a used page containing invalid data can be written to as long as the target page has not been programmed after the last erase cycle.

Once a threshold of page usage is reached for a Partially Written Block within the User Pool, the block is cycled into the OP pool and the data are read in single or multiples of pages into a data buffer on the controller, without accessing the host system containing the SSD. Using the translation lookaside buffers as reference, the controller is aware of whether a page is used or occupied, and only data from occupied pages are read into the buffer on the controller and then re-written to a different erased block in which the equivalent page number is vacant. Simultaneously, the translation lookaside buffers are updated to reflect the new physical address of the data. As soon as all valid data are stored elsewhere, the block from which the data were copied is erased as part of deduplication and without the need of the host issuing an erase or TRIM command to become an Erased Block that can be entered into the OP pool. In addition, the block to which the data were written becomes a substantially Fully Written Block of the User Pool. A Fully Written Block does not require that all of its pages are written to, but only that the block is utilized at a much higher degree than a typical Partially Written Block.

In view of the above, the SSD can be described as having a "self-trim" function, which as used herein means an operation carried out internally on an SSD and, since a TRIM command is not required from the host system, independently of the host system in which the SSD operates.

Optionally, a larger dedicated cache that is not integrated onto the controller can be implemented on the SSD to allow for faster transfers of data from one physical address to a second physical address within the NAND flash memory of the SSD. For example, FIG. 2 represents a shadow RAM (random access memory), for example, DRAM, SRAM or a non-volatile memory device with high endurance (for example, PCM or FRAM) on the SSD that can be implemented for this purpose.

While certain components are shown and preferred for the self-trimming NAND flash solid state drive of this invention, it is foreseeable that functionally-equivalent components could be used or subsequently developed to perform the intended functions of the disclosed components. For example, flash memory devices could be fabricated to contain bypass circuitries that contain various electrical components in addition to or other than those noted in FIG. 2. Therefore, while the invention has been described in terms of a preferred embodiment, it is apparent that other forms could be adopted by one skilled in the art, and the scope of the invention is to be limited only by the following claims.

The invention claimed is:

1. A solid state drive adapted for use with a host system, the solid state drive comprising:
    a controller; and
    at least one NAND flash-based non-volatile memory device comprising pages that are organized into memory blocks, the memory blocks being minimum-erasable units of the memory device, the pages being sequentially programmable and readable such that some of the memory blocks are partially written blocks, the memory blocks being partitioned into at least first and second pools that constitute two virtual address spaces of the memory device, the first pool being a user-accessible pool to which the controller virtually assigns a plurality of the memory blocks as user-accessible memory blocks, and the second pool being an over-provisioning pool to which the controller virtually assigns a plurality of the memory blocks as over-provisioned memory blocks;
    wherein the solid state drive is adapted to operate such that each of the memory blocks can be transitioned between the user-accessible pool and the over-provisioning pool, data are written to pages of the memory blocks virtually assigned to either the user-accessible pool or the over-provisioning pool, pages from a first partially written block are copied into a second partially written block without accessing the host system, and the first partially written block is erased to constitute an erased block after all pages of the first partially written block have been copied to the second partially written block and without a TRIM or erase command from the host system.

2. The solid state drive of claim 1, wherein the pages copied from the first partially written block to the second partially written block are read into a buffer on the controller before being written back to the second partially written block.

3. The solid state drive of claim 2, wherein the memory blocks are virtually assigned to the user-accessible pool or the over-provisioning pool on the basis of a wear-leveling algorithm performed by the controller.

4. The solid state drive of claim 1, wherein the pages copied from the first partially written block to the second partially written block are read into a cache not integrated onto the controller before being written back to the second partially written block.

5. The solid state drive of claim 4, wherein the memory blocks are virtually assigned to the user-accessible pool or the over-provisioning pool on the basis of a wear-leveling algorithm performed by the controller.

6. The solid state drive of claim 1, further comprising a translation lookaside buffer that is updated when the pages are copied from the first partially written block to the second partially written block.

7. The solid state drive of claim 1, wherein the solid state drive is adapted to operate such that the erased block is assigned to the over-provisioning pool to maintain a capacity of the over-provisioning pool.

8. The solid state drive of claim 1, further comprising a content-addressable memory that keeps track of virtual mapping of physical addresses of the memory devices.

9. The solid state drive of claim 1, wherein the solid state drive is installed and operating in the host system.

10. The solid state drive of claim 9, wherein the host system is a processing apparatus chosen from the group consisting of personal computers and workstations.

11. A solid state drive adapted for use with a host system, the solid state drive comprising:
    a controller; and
    at least one NAND flash-based non-volatile memory device comprising pages that are organized into memory blocks, the memory blocks being minimum-erasable units of the memory device, the pages being sequentially programmable and readable such that some of the memory blocks are partially written blocks, the memory blocks being partitioned into at least first and second pools that constitute two virtual address spaces of the memory device, the first pool being a user-accessible pool to which the controller virtually assigns a plurality of the memory blocks as user-accessible memory blocks, and the second pool being an over-provisioning pool to which the controller virtually assigns a plurality of the memory blocks as over-provisioned memory blocks;
    wherein the solid state drive is adapted to operate such that each of the memory blocks can be transitioned between the user-accessible pool and the over-provisioning pool, data are written to pages of the memory blocks virtually assigned to either the user-accessible pool or the over-provisioning pool, pages from a first partially written block in the over-provisioning pool are copied into a second partially written block in the user-accessible pool using a buffer on the controller without accessing the host system, and the first partially written block is erased to constitute an erased block after all pages of the first partially written block have been copied to the second partially written block and without a TRIM or erase command from the host system.

12. The solid state drive of claim 11, further comprising a content-addressable memory that keeps track of virtual mapping of physical addresses of the memory devices.

13. A method of operating a solid state drive within a host system, the solid state drive comprising a controller and at least one NAND flash-based non-volatile memory device comprising pages that are organized into memory blocks, the memory blocks being minimum-erasable units of the memory device, the pages being sequentially programmable and readable such that some of the memory blocks are partially written blocks, the method comprising:
    partitioning the memory blocks into at least first and second pools that constitute two virtual address spaces of the memory device, the first pool being a user-accessible pool and the second pool being an over-provisioning pool;
    operating the controller to virtually assign to the user-accessible pool a plurality of the memory blocks as user-accessible memory blocks, virtually assign to the over-provisioning pool a plurality of the memory blocks as over-provisioned memory blocks, and transition the memory blocks between the user-accessible pool and the over-provisioning pool;

writing data to pages of the memory blocks virtually assigned to either the user-accessible pool or the over-provisioning pool;

copying pages from a first partially written block into a second partially written block without accessing the host system; and erasing the first partially written block to constitute an erased block after all pages of the first partially written block have been copied to the second partially written block, wherein the erasing step is performed without a TRIM or erase command from the host system.

14. The method of claim 13, wherein the pages copied from the first partially written block to the second partially written block are read into a buffer on the controller before being written back to the second partially written block.

15. The method of claim 13, wherein the pages copied from the first partially written block to the second partially written block are read into a cache not integrated onto the controller before being written back to the second partially written block.

16. The method of claim 13, wherein the memory blocks are partitioned to the first and second pools on the basis of a wear-leveling algorithm performed by the controller.

17. The method of claim 13, further comprising updating a translation lookaside buffer when the pages are copied from the first partially written block to the second partially written block.

18. The method of claim 13, further comprising assigning the erased block to the over-provisioning pool to maintain a capacity of the over-provisioning pool.

19. The method of claim 13, further comprising tracking virtual mapping of physical addresses of the memory devices with a content-addressable memory.

20. The method of claim 13, wherein the host system is a processing apparatus chosen from the group consisting of personal computers and workstations.

* * * * *